INVENTOR.
Otto J. M. Smith
BY Flehr & Swain
ATTORNEYS

INVENTOR.
Otto J. M. Smith
BY Flehr & Swain
ATTORNEYS

May 29, 1956 O. J. M. SMITH 2,748,278

SINE WAVE GENERATOR

Filed May 21, 1951 3 Sheets-Sheet 3

INVENTOR.
Otto J. M. Smith

BY Flehr & Swain

ATTORNEYS 2,748,278

SINE WAVE GENERATOR

Otto J. M. Smith, Berkeley, Calif., assignor to Hewlett-Packard Company, Palo Alto, Calif., a corporation of California Application May 21, 1951, Serial No. 227,368

9 Claims. (Cl. 250—36)

This invention relates generally to electrical apparatus for the generation of pulses of sine wave form.

The conventional electronic generators that are commonly used for generating pulses of sine wave form are subject to certain inherent limitations. The common types of generator making use of resonant circuits (i. e. LC or RC) to determine the frequency of operation are subject to the practical limitation that for the lower frequencies the reactance elements of the resonant circuits tend to be of excessive size, and it is difficult to maintain an accurate sine wave form. Also where a nonlinear element is used for amplitude control, the transient stability tends to be relatively poor for the lower frequencies. As a result such generators are seldom used for test purposes at frequencies below about one cycle per second, where it is important to have an accurate sine wave form with good transient stability. In an effort to overcome the deficiencies of generators having resonant circuits, generators have been constructed with mechanically driven shafts as frequency determining elements. While this makes possible operation at lower frequencies, it necessitates mechanical complications, and it is difficult to adapt such a generator for operation over a wide range of frequencies, as for example frequencies as low as .01 cycle per second and ranging up to 1000 cycles per second or higher.

In general it is an object of the present invention to provide an improved sine wave generator which is capable of producing accurately formed sine waves over a wide frequency range.

Another object of the invention is to provide a generator of the above character which dispenses with the use of either resonant circuits or mechanically driven devices.

Another object of the invention is to provide a generator of the above character having good transient stability at low frequencies.

Additional objects of the invention will appear from the following description in which the preferred embodiments have been set forth in detail in conjunction with the accompanying drawing.

Referring to the drawing.

Figure 5:
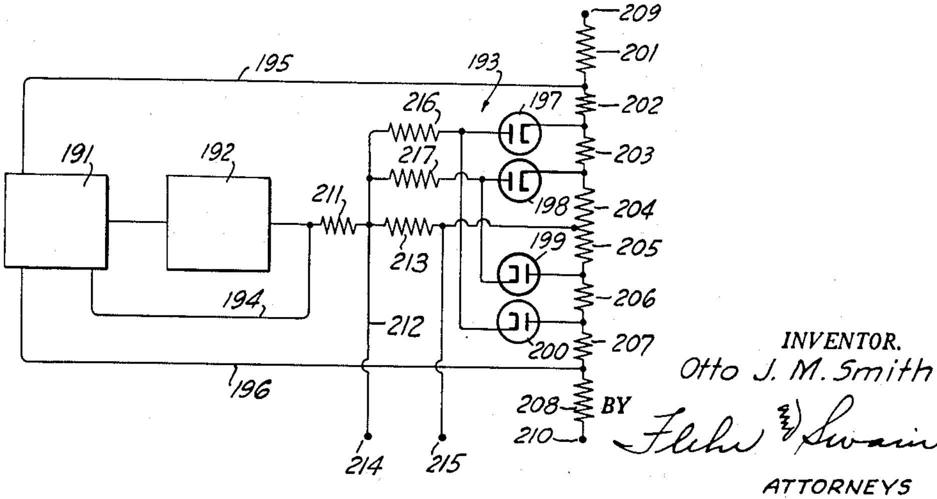

Figure 5 diagrammatically illustrates another embodiment of the invention.

Figure 6:
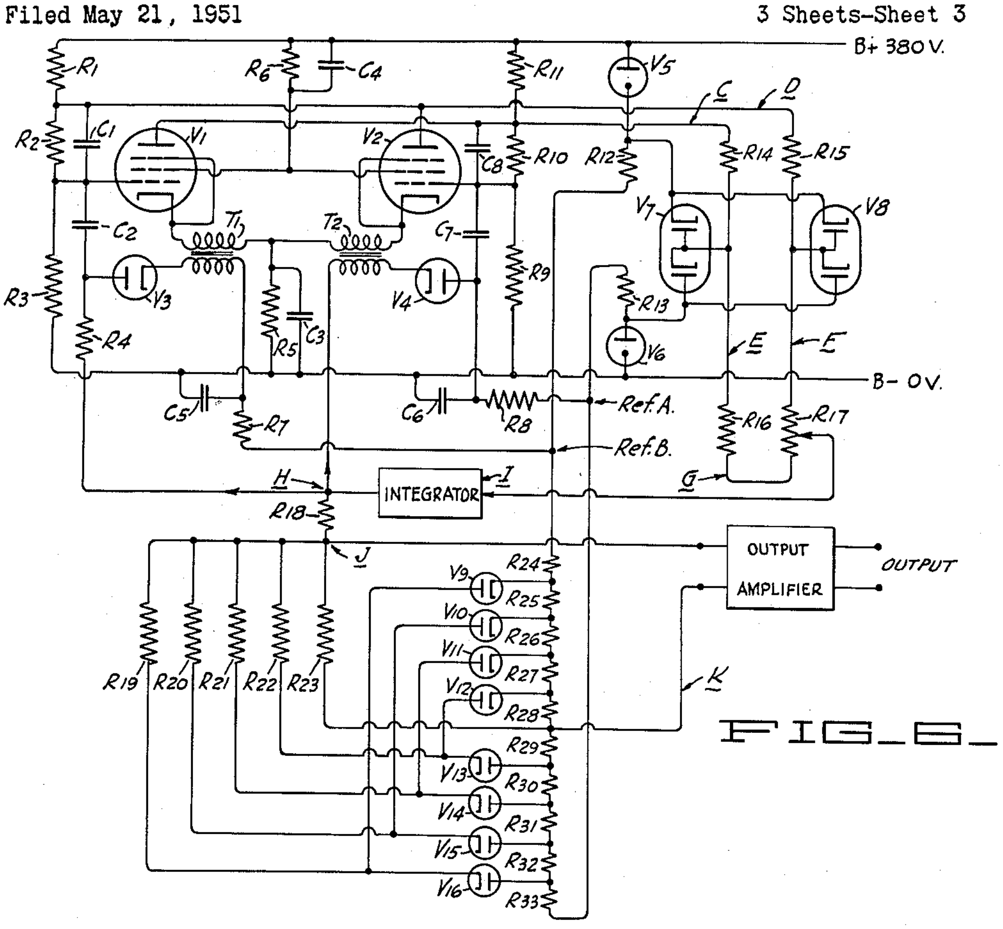

Figure 6 is a circuit diagram illustrating another embodiment of the invention.

Figure 7:
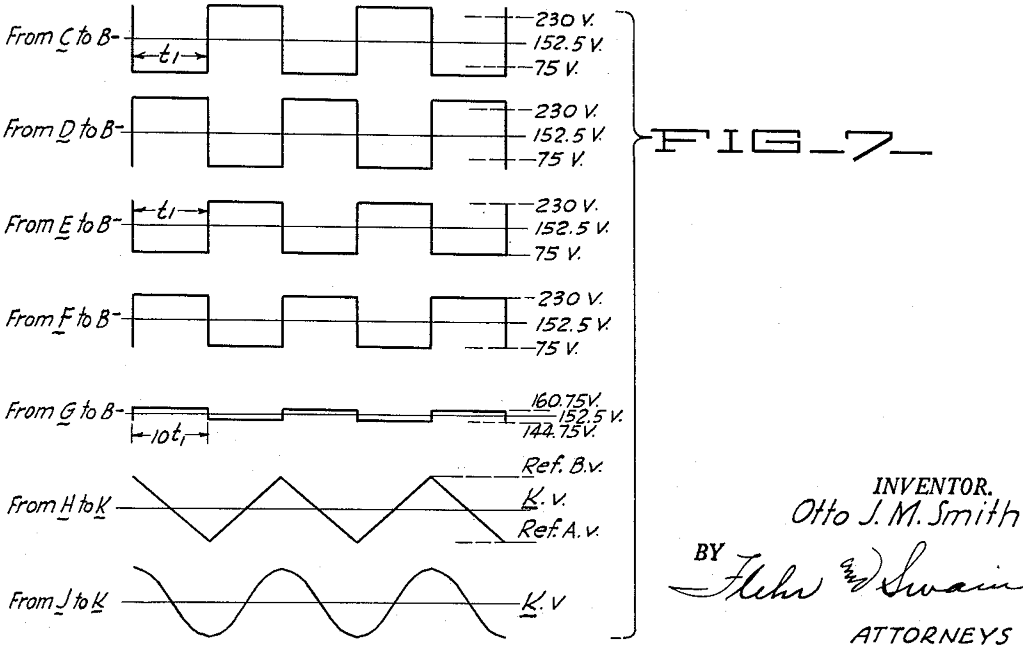

Figure 7 illustrates various wave forms of pulses between various points in the circuit of Figure 6.

The present invention makes use of a stable form of generator capable of producing pulses of non-sine wave form at a predetermined selected frequency. The pulses of non-sine wave form are applied to a sine function generator which serves to produce a composite sine wave in its output circuit. Preferably the non-sine wave is triangular and is produced by use of electronic means of the multivibrator type. The sine function generator makes use of a plurality of elements or devices having nonlinear characteristics, and arranged to produce a composite wave which closely approximates a true sine wave.

Figure 1:
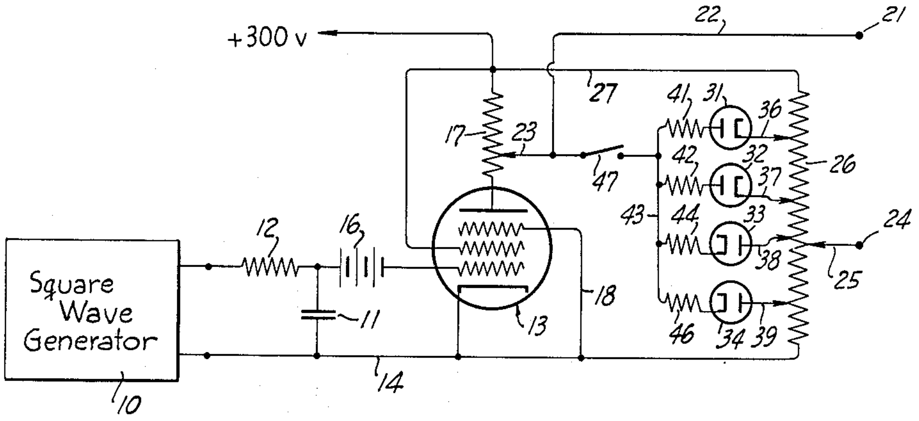
Figure 1 is a circuit diagram illustrating one embodiment of the present invention.
Figure 2:
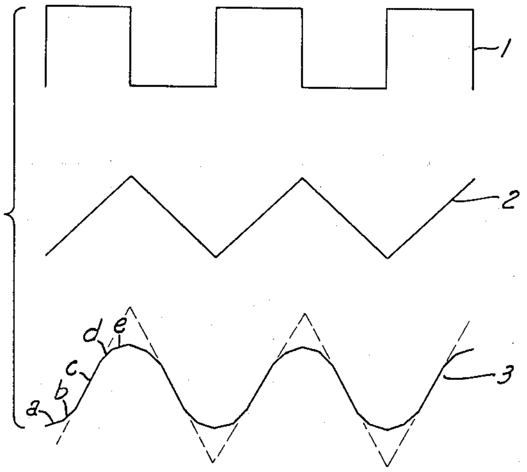
Figure 2 illustrates various wave forms of pulses of different points in the circuit of Figure 1.

The embodiment of the invention illustrated in Figure 1 of the drawing consists of a square wave generator 10 of the multivibrator or flip-flop type. Square wave electronic generators are well known to electronic engineers and serve to produce pulses having a voltage wave form as illustrated by curve 1 of Figure 2. An integrating condenser 11 is connected across the output of the generator 10 through the resistor 12. Assuming that the condenser 11 is of adequate capacitance the voltage across the same must necessarily follow a triangular wave form as represented by curve 2 of Figure 2.

A vacuum tube 13 has its control circuit coupled across the integrating condenser 11. This tube may be a suitable pentode, having its cathode connected to the grounded or low potential conductor 14 and its control grid connected to the high voltage side of condenser 11 through the biasing battery 16. The anode or plate is connected through the resistor 17 to the positive side of a plate current supply as indicated. The screen grid is positively biased by connecting the same to the plate supply as illustrated, and the suppressor is directly connected to the cathode by conductor 18.

The plate circuit of the vacuum tube 13 is coupled to means forming a sine function generator. Thus in this embodiment the output terminal 21 is connected by conductor 22 to an adjustable tap 23 on the resistor 17. Output terminal 24 is connected to an adjustable tap 25 on the voltage dividing resistor 26. One terminal of the resistor 26 connects to the conductor 14 and the cathode of tube 13 and the other terminal is connected by conductor 27 to the source of plate current.

A plurality of nonlinear devices 31, 32, 33 and 34 are connected between various points along the resistor 26 and the tap 23. In this instance each of the nonlinear devices is a diode, and the cathodes of the diodes 31 and 32 are connected to the taps 36 and 37 on the resistor 26. The plates of the diodes 33 and 34 are connected to the taps 38 and 39 on the resistor 26. Resistors 41 and 42 connect the plates of the diodes 31 and 32 to the conductor 43. Resistors 44 and 46 similarly connect the cathodes of the diodes 33 and 34 to the conductor 43. Conductor 43 is connected to the conductor 22 and tap 23, by the switch 47.

Operation of the apparatus illustrated in Figure 1 is as follows: Assuming that the generator 10 is generating a relatively accurately formed square or rectangular wave form corresponding to the curve 1 of Figure 2, and that this geneator is operating at a desired selected frequency, then the voltage wave form across the integrating condenser 11 is triangular and corresponds to the curve 2 of Figure 2. The vacuum tube 13 converts the voltage wave across condenser 11 to a current triangular wave at the plate. When the switch 47 is open, the voltage across the plate resistor 17 is linearly proportional to the current. When switch 47 is closed to generate a composite sine wave form across the output terminals 21 and 24, controlled current flow occurs through the diodes 31, 32, 33 and 34, and with proper biasing of these diodes, the desired composite since wave is formed at the output terminals. By way of example, assuming that the plate current source is +300 volts as indicated, the tap 23 is adjusted whereby when switch 47 is open, the voltage across this switch swings through 150 volts from peak to peak. Assuming that the switch 47 is closed at the instant of minimum voltage across the same, diodes 33 and 34 immediately conduct current, and the voltage across terminals 21 and 24, which was previously 25 volts, diminishes by about 25 volts to 50 volts above the cathodes of diodes 33 and 34. In other words, the potential of terminal 21, which formerly was −75 volts with respect to terminal 24, rises by about 25 volts to −50 volts with respect to terminal 24. Diode 34 is biased whereby after 30 electrical degrees of the cycle, it reaches cutoff, whereby at that time only the diode 33 conducts current. Diode 33 continues to conduct current for the next 30 electrical degrees of the cycle, and after a total of 60 electrical degrees diode 33 reaches cutoff, whereby for the next interval all of the diodes are biased to cutoff. The biasing of diode 32 is adjusted whereby after 120 electrical degrees of the cycle, it begins to conduct, thereby causing the rate of voltage rise to diminish. Diode 31 is adjusted to conduct after 150 electrical degrees of the cycle, thereby causing the rate of voltage rise to reach the same minimum at which it started. During the second half of the cycle the voltage diminishes in a sequence reverse to that in which it increased.

The potential of terminal 24 with respect to the cathode of tube 13 is adjused by moving the tap 25 on the voltage divider resistor 26 to be equal to the average value of the potential on terminal 21. Under such conditions the composite voltage wave form of the output between terminals 21 and 24 approximates a sine wave corresponding to the curve 3 of Figure 2. Each half of a wave consists of five approximately straight line segments indicated by the letters *a*, *b*, *c*, *d* and *e*.

The apparatus described above is capable of operating satisfactorily over a wide frequency range, depending upon the permissible frequency range of the square wave generator 10. Thus it is possible to generate sine waves with a relatively high degree of accuracy for frequencies as low as .01 cycle per second, or as high as 10 kc. per second. Theoretically there is no low or high limit to the frequency range over which the apparatus may operate. A particular feature of the invention is that the circuitry employed is relatively simple, and its operation does not depend upon conventional resonant circuits or mechanically driven devices.

The accuracy with which a sine wave is approximated is dependent upon the number of diodes employed, their accurate biasing and the values of their series resistors. By increasing the number of diodes the accuracy can be increased accordingly.

Figure 3:
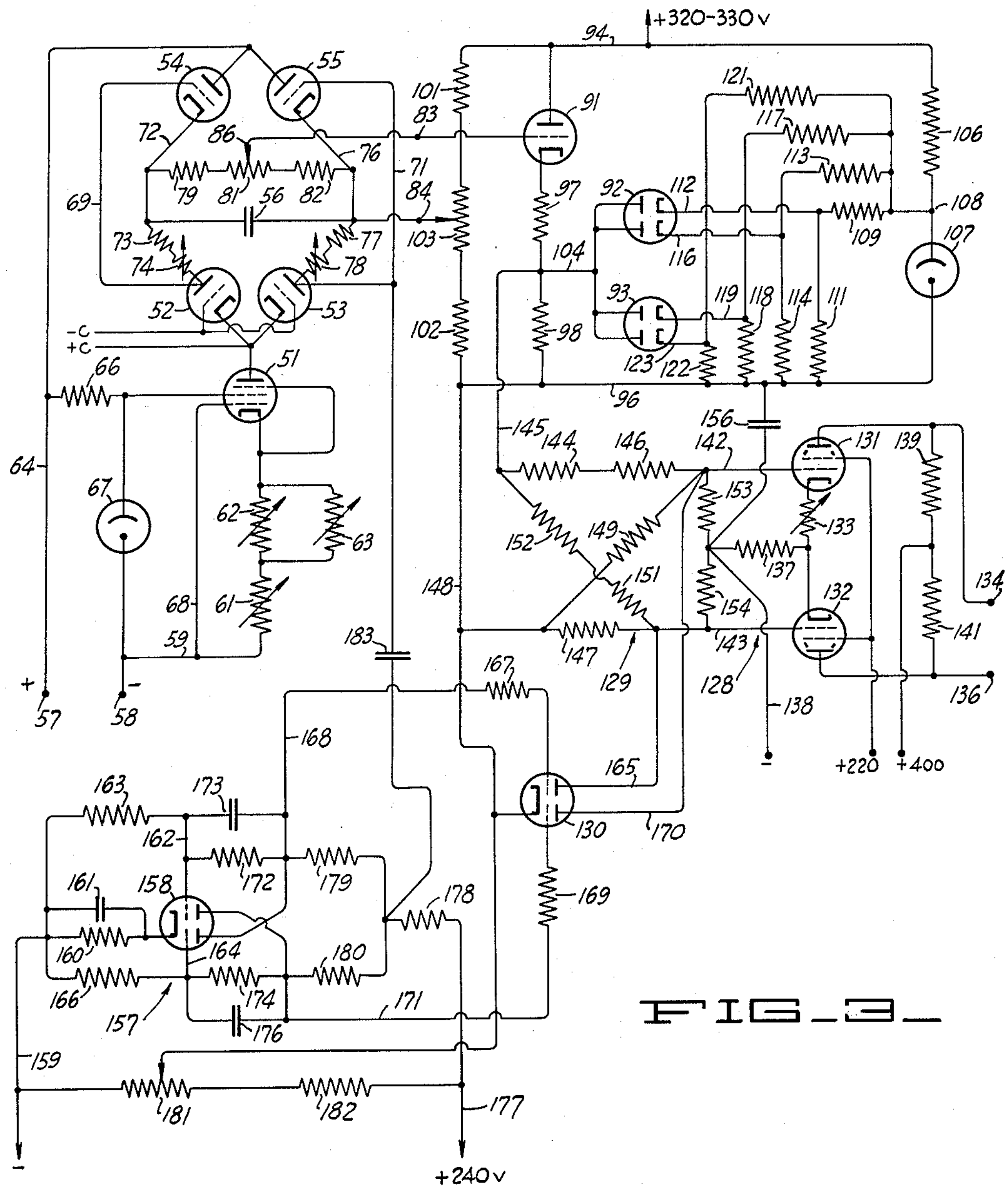
Figure 3 is a circuit diagram illustrating another embodiment of the invention.

Figure 3 illustrates another embodiment of the invention which is designed particularly as a low frequency generator. Vacuum tubes 51, 52, 53, 54 and 55 form a triangular voltage wave generator. Tube 51 is preferably a pentode and is arranged to provide constant current to the tubes 52, 53, 54 and 55. The tubes 52, 53, 54 and 55 form a reversing switch which connects the condenser 56 in series with the plate of tube 51 and in alternately opposite polarities. A source of plate current supply for the foregoing tubes is connected to terminals 57 and 58 and may for example range from 370 to 390 volts. The negative side of this source is connected by conductor 59 to the cathode of tube 51 through the series connected variable resistors 61 and 62, the latter being shunted by the variable resistor 63. The positive side of the current supply is connected by conductor 64 to the plates of the tubes 54 and 55. The screen grid of tube 51 is connected to conductor 64 through the resistor 66, and to the negative side of the current supply through the voltage regulating tube 67.

The suppressor grid of tube 51 is directly connected to the cathode, and the control grid is connected by conductor 68 to the conductor 59. Conductors 69 and 71 directly connect the plates of tubes 52 and 53 with the control grids of tubes 54 and 55. The control grids of tubes 52 and 53 are connected to a suitable adjustable source of biasing voltage as indicated. Conductor 72 connects the cathode of tube 54 with the plate of tube 52, through the series connected fixed and variable resistors 73 and 74. Conductor 76 similarly connects the cathode of tube 55 to the plate of tube 53 through the fixed and variable resistors 77 and 78. Condenser 56 connects between the conductors 72 and 76, and is shunted by the series connected fixed and tapped resistors 79, 81 and 82.

The output terminals 83 and 84 connect respectively to the tap 86 on resistor 81, and the conductor 76. A triangular voltage wave form is developed between these output terminals. The amplitude of this triangular wave is determined by the firing voltage of the thyratron tubes 52 and 53.

The multivibrator described above operates as follows: When the tubes 53 and 54 are in the cut-off or nonconducting state, condenser 56 charges by current flow through tubes 51, 52 and 55. The voltage drop across the resistors 73 and 74 maintains tube 54 cut-off. When the condenser 56 charges up to the firing voltage for tube 53, which is determined by the grid bias setting, this tube conducts suddenly and impresses a negative voltage on the plate of tube 52, extinguishing the arc in the same. Tube 55 is also cut off due to the voltage drop across resistors 77 and 78. The condenser 56 now charges in the opposite direction through tubes 51, 53 and 54, until the firing potential of tube 52 is reached to cause the cycle to be repeated. The frequency of operation is controlled by the bias resistor 62, which is padded with the series and shunt resistors 61 and 63, to facilitate close adjustment. The resistors 74 and 78 should vary nonlinearly with the frequency, and preferably should be gang connected for simultaneous adjustment with the tuning resistor 62. This makes possible maintenance of constant output amplitude at all values of selected frequency. This circuit can be constructed to produce a minimum triangular frequency of about 0.05 cycle per second with condenser 56 having a capacity of 10 mfd., which corresponds to an output sine wave of 0.025 C. P. S.

Tube 91 has its input coupled to the triangular wave generator just described, and operates as a cathode follower type of buffer amplifier. Tubes 92 and 93 can be of the type known by manufacturers' specifications as No. 6H6, and function in place of two of the independent diodes of Figure 1.

The control grid of amplifier tube 91 is connected to the terminal 83. The plate is connected to conductor 94, and from thence to a source of plate current as indicated. Conductor 96 connects to the cathode of tube 91 through the series resistors 97 and 98. As will be presently explained this connector connects to an adjustable source of biasing voltage. Series connected resistors 101, 102 and 103, the last having an adjustable tap, connect between the conductors 84 and 86. The adjustable tap on resistor 103 connects with the terminal 84.

The plates of the tubes 92 and 93 all connect to a common conductor 104, which in turn connects to the junction point between the cathode resistors 97 and 98. Resistor 106 also connects from conductor 94 to conductor 96, through the voltage regulating tube 107. The terminal 108 of the resistor 106 connects with the cathodes of the tubes 92 and 93 through a network of biasing resistors. Thus two series connected resistors 109 and 111 connect from point 108 to conductor 96, and have the junction point between the same connected by conductor 112 to the first cathode of tube 92. Similarly connected resistors 113 and 114 have their junction point connected by conductor 116 to the second cathode of tube 92. Similar resistors 117 and 118 are connected by conductor 119 to the first cathode of tube 93. Similar resistors 121 and 122 are connected by conductor 123 with the second cathode of tube 93. The resistors just described form in effect a voltage dividing network which is arranged to provide preselected biasing voltages to the cathodes of the tubes 92 and 93.

The function generator described above which includes particularly the tubes 92 and 93, generates only a half sine wave. In order to provide a complete sine wave I provide means which alternately reverses the polarity of the function generator. For this purpose I provide the electronic amplifying means designated generally at 128, in conjunction with the resistance bridge 129 and the switching tube 130. The amplifying means 128 is of the push pull type and includes vacuum tubes 131 and 132, which have their cathodes connected together through the variable balancing resistor 133. The plates of these tubes are connected to the output terminals 134 and 136. The cathodes are connected to the negative side of a plate current supply through the resistor 137 and conductor 138, as indicated. The positive side of the plate current supply is connected to the plates through the resistors 139 and 141. The screen grids of tubes 131 and 132 are connected to a suitable biasing voltage as indicated, and the control grids are connected by conductors 142 and 143 to the resistance bridge 129. The bridge includes the series connected resistors 144 and 146, which connect conductor 142 to the output lead 145 from the function generator. Another resistor 147 connects conductor 143 to the conductor 148, which in turn connects with conductor 96 of the function generator. Conductor 142 connects with conductor 148 through the resistor 149, and conductor 143 connects with terminal 127 through the series connected resistors 151 and 152. Balanced resistors 153 and 154 connect conductors 142 and 143 with the conductor 138 and the negative side of the plate current supply. A condenser 156 also connects from conductor 138 to the conductor 96 of the function generator.

An additional square wave generator 157 is employed which includes the tube 158. This tube can be of the type known by manufacturers' specifications as No. 6J6, and includes two plates and independent control grids for the same as indicated. In place of such a tube I can employ separate triodes of proper characteristics. The cathode of tube 158 is connected to the negative side (i. e. conductor 159) of a source of plate potential through the resistor 160, which is shunted by condenser 161. One of the control grids is connected by conductor 162 to the negative side of the plate supply through resistor 163. The other control grid is likewise connected by conductor 164 and resistor 166 with the negative side of the plate supply.

The switching tube 130 can be of the type known by manufacturers' specifications as No. 6J6, and includes two plates and independent control grids for the same. The cathode of this tube is directly connected to the conductor 148. One of the plates is connected by conductor 165 to the conductor 143 of the bridge 129. The other plate is connected by conductor 170 to the conductor 142 of the bridge. One control grid is connected through resistor 167 and conductor 168 with one of the plates of tube 158. The other control grid of tube 130 is similarly connected through resistor 169 and conductor 171 with the other plate of tube 158. Conductor 162 is connected to the conductor 168 through the resistor 172, the latter being shunted by the condenser 173. A resistor 174 similarly connects between conductors 164 and 171, and is shunted by condenser 176. Conductor 177 leads to the positive side of the plate supply and is connected through resistor 178 with the junction point between resistors 179 and 180. The latter connect with the plates of tube 158 as illustrated. Series resistors 181 and 182 are connected between the conductors 159 and 177, and a tap on resistor 181 connects to conductor 148 and provides an adjustable source of biasing voltage. The conductor 71 of the multivibrator is coupled to the junction point between resistors 178, 179 and 180, through the condenser 183.

Figure 4:
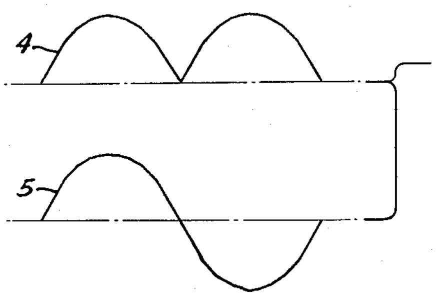
Figure 4 illustrates wave forms serving to explain the operation of Figure 3.

Operation of the apparatus illustrated in Figure 3 is as follows: A triangular wave is generated between the terminals 83 and 84 which is repeated by the amplifier tube 91 and applied to the function wave generator including the tubes 92 and 93. With a proper biasing of the tubes 92 and 93, successive half sine waves are generated as illustrated by curve 4 of Figure 4. These half sine waves are converted to the full sine wave 5 of Figure 4, by the action of the tube 130. The voltage developed across the series resistors 77 and 78 is a square wave with the same frequency as the triangular wave, and is differentiated by the condenser 183 to provide trigger pulses for the square wave generator formed by the tube 158. The square wave generator is designed to operate at half the frequency of the multivibrator formed by the tubes 51 to 55, inclusive, in the same manner as conventional binary scaling circuits. Pulses supplied by the tube 158, at one-half frequency, are applied successively to the control grids of the switching tube 130, whereby the wave form developed between the conductors 142 and 143 corresponds to a full sine wave and is applied to the amplifier tubes 131 and 132. These tubes function as a push-pull amplifier to supply a load connected to the terminals 134 and 136.

Figure 5 illustrates another embodiment of the invention in which means is provided to insure a triangular wave of fixed amplitude for different operating frequencies. Thus the square wave generator 191 supplies pulses of a predetermined frequency to the linear integrator 192, which in turn supplies pulses to the function generator 193. The generator 191 can be a bistable circuit of the multivibrator type, and the integrator 192 can include elements such as shown in Figure 1 (i. e. condenser 11 and tube 13). A feed back 194 serves to supply switching signals to the generator 191. The function generator 193 can include diodes 197, 198, 199 and 200 corresponding to the tubes 31–34 of Figure 1. The resistors 201—208 are connected in series with the B battery positive and negative terminals 209 and 210.

Resistor 211 is connected between the output of integrator 192 and the conductor 212. Resistor 213 connects conductor 212 to the junction between resistors 204 and 205. The output terminals 214 and 215 connect across resistor 213. Diode 197 has its cathode connected to the junction between resistors 202 and 203, and its anode connected to terminal conductor 212 in series with resistor 216. The cathode of diode 198 is connected to the junction between resistors 203 and 204, and the plate to terminal 213 in series with resistor 217. The plate of diode 199 is connected to the junction between resistors 205 and 206, and the cathode to the plate of diode 198. The plate of diode 200 connects to the junction between resistors 206 and 207, and the cathode to the plate of tube 197. Path 195 connects from the junction point between resistors 201 and 202 to the multivibrator 191, and path 196 makes a like connection from the junction between resistors 207 and 208. The two connections 195 and 196 establish reference voltages for the multivibrator.

The arrangement of Figure 5 operates as follows: A square wave is generated by generator 191 at a selected frequency. Switching signal voltage is fed back from the output of integrator 192 and the square wave changes polarity at the instant the triangular wave reaches a predetermined potential. The unit 191 is so constructed that it is triggered by voltage fed back from integrator 192 when such voltage is nearly equal to the reference voltage. The reference voltages are derived in such a manner that if the voltage applied to terminals 209 and 210 should vary slightly, both the square wave and the reference voltages vary in the same ratio. Therefore there would be a small change in the amplitude of the triangular wave, without a change in frequency. It will be evident that this makes for general stability of the system.

Figure 6 illustrates an actual circuit incorporating the features of Figure 5. For simplicity in specifying values for the various elements of this circuit, conventional symbols have been used with sub-numbers, in place of numerals as in Figures 1, 3 and 5. Vacuum tubes $V_1$ and $V_2$ form a part of the multivibrator and were 6AU6 (manufacturer's number) pentodes. Vacuum tubes $V_3$ and $V_4$ were each one-half of a 6AL5 tube, and form together with the transformers $T_1$ and $T_2$, a part of the multivibrator. The tubes $V_5$ and $V_6$ were OA2(VR150) and OA3(VR75) respectively, and function as voltage regulators. Tubes $V_7$ and $V_8$ were each a number 6AL5, and in all were equivalent to four separate diodes.

The various resistors $R_1$ to $R_{33}$, inclusive, were as follows: $R_1$, 68K (K=1000 ohms); $R_2$, 330K; $R_3$, 22K; $R_4$, 12K; $R_5$, 1500 ohms; $R_6$, 56K; $R_7$, 100K; $R_8$, 100K; $R_9$, 22K; $R_{10}$ 33K; $R_{11}$, 68K; $R_{12}$, 2K; $R_{13}$, 5K; $R_{14}$, 27K; $R_{15}$, 27K; $R_{16}$, 107.5K; $R_{17}$, 100K; and $R_{18}$ to $R_{33}$, inclusive, adjusted for proper sine wave approximation.

The various condensers $C_1$ to $C_8$, inclusive, were as follows: $C_1$, 47 $\mu\mu$f ($\mu=10^{-6}$); $C_2$, 500 $\mu\mu$f; $C_3$, 0.01 $\mu$f; $C_4$, 0.01 $\mu$f; $C_5$, 0.01 $\mu$f; $C_6$, 0.01 $\mu$f; $C_7$, 500 $\mu\mu$f; and $C_8$, 47 $\mu\mu$f.

As previously mentioned, the tubes $V_1$, $V_2$, $V_3$ and $V_4$ form a multivibrator or bistable unit. If one should disconnect each of the condensers $C_2$ and $C_7$, to avoid inductive coupling between the grid to cathode of each of the tubes $V_1$ and $V_2$, the remaining circuit would then be substantially the same as the well known "flip-flop" or "Eccles-Jordan trigger circuit." With such a circuit when one of the tubes $V_1$ or $V_2$ is conducting, its plate voltage is relatively low and thereby impresses a low voltage on the grid of the cut-off tube. The high voltage at the plate of the cut-off tube results in a high grid voltage on the conducting tube. This serves to maintain a stable condition. When an impulse is placed on the grid of either tube in the proper polarity to upset this stable condition, there is a regenerative action which rapidly transfers the conducting state from one tube to the other. Thus if a negative pulse is supplied to the grid of the conducting tube, a decrease in plate current results, which is accompanied by an increase in plate voltage. Such increased plate voltage serves to increase the grid voltage on the non-conducting tube, thereby causing conduction to start which results in a lower plate voltage on that tube. The lower plate voltage on the tube which is beginning to conduct causes a further reduction in grid voltage on the tube that originally received the negative trigger. This regenerative action rapidly causes the first tube to be cut off and therefore the transfer to the second stable condition is complete. In the special bistable unit of Figure 6, there are two circuits which employ a regenerative loop to produce a pulse when the two input voltages are equal. Each of such circuits may be compared to what is commonly known as the "multiar circuit." One such circuit is composed of tubes $V_1$, $V_3$ and transformer $T_1$, and the other of tubes $V_2$ and $V_4$, and the transformer $T_2$. Considering the first, regeneration from grid to cathode of tube $V_1$ can only occur when tubes $V_1$ and $V_3$ are conducting. When this condition obtains, the combination operates as a self-pulsing oscillator. When tube $V_1$ is in the conducting state and tube $V_3$ cut off, no regeneration occurs because tube $V_3$ appears like an open circuit and there is no inductive coupling from the grid of tube $V_1$ to cathode.

The plate and cathode of tube $V_3$ are resistively coupled to two external voltages. Thus the cathode of tube $V_3$ is connected to a reference voltage B, and the plate is connected to the output of the integrator I. As will be presently explained, certain features of the circuit cause the output voltage of the integrator to be less than, but approaching the reference voltage B, while tube $V_1$ is conducting. When the integrator output voltage has increased to very nearly reference voltage B, tube $V_3$ becomes conducting. This results in a low impedance across tube $V_3$, thus completing the regenerative grid-cathode loop of tube $V_1$. At this time the system $V_1$ and $V_3$ becomes an oscillator and, as the grid of tube $V_1$ is caused to go negative, there results the necessary trigger to initiate a transfer of stable states in the multivibrator composed of tubes $V_1$ and $V_2$ as previously described. As soon as the conducting state is transferred to tube $V_2$ the circuit previously described composed of tubes $V_1$ and $V_3$ is out of operation because tube $V_1$ is cut off. The output of the integrator now starts to fall toward reference voltage A. When this condition obtains, the previously described circuit composed of tubes $V_2$ and $V_4$ becomes oscillatory and therefore provides a negative pulse on the grid of tube $V_2$. This initiates triggering action necessary to return to the stable state in which tube $V_1$ is conducting, thus completing one cycle of operation.

As in Figure 5, the integrator I is of the amplified time constant type, or "Miller" integrator. For fixed parameters within the integrator, there results an output which depends only on the input wave form. As will be presently described, the square waves appearing at the plates of the previously described bistable unit, are clamped by a circuit including the tubes $V_7$ and $V_8$. One phase of the clamped square wave is applied to the input of the integrator. Amplitude of the applied wave can be adjusted by adjusting the taps of the voltage divider $R_{17}$. The output of the integrator I is a triangular wave having a time rate of voltage change directly proportional to the magnitude of the square wave input. Because the square wave period depends on time required for the integrator output to swing between reference voltage A and B, it follows that the frequency of generation of both the triangular and square waves depends upon three factors. First, the reference voltages A and B; second, a rate constant associated with the integrator which depends upon its internal parameters, and third, the magnitude of the square wave applied. In the present system the magnitude of the square wave applied is adjusted to vary the frequency. This is accomplished by varying the potentiometer $R_{17}$.

The previously mentioned clamping circuit is composed of tubes $V_7$ and $V_8$, working in conjunction with tubes $V_5$ and $V_6$. The square waves appearing at the plates of the bistable unit are subject to amplitude variations due to aging of the tubes $V_1$ and $V_2$, and therefore it is desirable to clamp the square wave that is applied to the frequency control potentiometer $R_{17}$ in order to maintain frequency calibration. As previously described, the bistable unit requires that the wave form at the plate of tube $V_2$ be applied to the integrator. Thus the wave is coupled to tube $V_8$ through the resistor $R_{15}$. The action of tube $V_8$ is such that if the applied wave form has peak excursions in excess of the potentials on the cathode and plate, these being determined by regulator tubes $V_5$ and $V_6$, a current will flow through resistor $R_{15}$ which drops the voltage to very nearly the potential of the regulated element of the conducting tube. The action of tube $V_7$ is the same as tube $V_8$, but 180° out of phase with it, inasmuch as it is coupled to the plate of tube $V_1$. In this way, wave forms appearing on the clamped sides of resistors $R_{14}$ and $R_{15}$ are assured to be of equal magnitude as well as 180° out of phase. It is possible to so proportion resistors $R_{16}$ and $R_{17}$ so that the full variation of resistor $R_{17}$ covers a specified frequency range. Also it should be noted that reference voltages A and B are derived from the regulator tubes $V_5$ and $V_6$. Therefore if the B+ voltage should vary slightly, both the square wave applied to the frequency control and the reference voltages would vary in the same ratio. As previously stated in connection with Figure 5, the result is that although the output rate of the Miller integrator would vary slightly, so also would the limits of excursion from reference voltage A to B. Therefore there would be a small change in amplitude of the triangular wave but no shift in frequency. This provides good stability in the operation of the bistable unit and Miller integrator, when considered collectively as the oscillating system.

Formation of the approximate sine function wave, in the circuit of Figure 6, is as follows: Point K of Figure 6 is at a potential midway between reference voltages A and B, and remains virtually constant at this potential due to the relatively heavy current which is allowed to flow through resistors $R_{24}$ to $R_{33}$, inclusive. The impedance of the output of the integrator is relatively low and therefore there exists a triangular wave between points H and K. If the diodes $V_9$ to $V_{16}$, inclusive, are removed, the only current path from H to K is through $R_{18}$ and $R_{23}$. The voltage appearing from J to K is a triangular wave of slope which depends upon the ratio of $R_{18}$ to $R_{23}$. If, for instance, the resistance of $R_{23}$ should be reduced in steps, the slope of the wave at J would also be reduced. Therefore if such changes in resistor $R_{23}$ can be made in the proper amount and at the proper times, the wave form J to K can be made to approximate a sine wave function. Assuming that the diodes $V_9$ to $V_{16}$ are connected, and the voltage at H rising toward reference voltage B, at the instant when point H is at the same potential as K, the slope at J is determined only by $R_{18}$ and $R_{23}$, because the bias voltages on tubes $V_9$ to $V_{16}$, inclusive, as provided by $R_{24}$ and $R_{33}$, are such that none of these tubes is conducting. When the voltage at J has risen to a value nearly equal to the voltage appearing on the cathode of tube $V_{12}$, then tube $V_{12}$ begins to conduct and a parallel path from J to K is provided through tube $V_{12}$ and resistor $R_{22}$. This shunting of $R_{23}$ causes the slope of the voltage at J to be reduced by the amount necessary to make the voltage at J approximately a portion of the sine function. When the voltage at J rises to a value nearly equal to that on the cathode of $V_{11}$ a new path parallel to $R_{23}$ and $R_{22}$ is provided through $R_{21}$ and thus the slope at J is further decreased in order to more nearly approximate the sine function in the next interval. The process continues until finally tubes $V_9$ to $V_{12}$ are all conducting just before the triangle at K reaches the reference voltage B, and at this time the slope at J is very nearly flat, which corresponds to the flatness of slope of the sine function near its crest. After the wave at K starts to fall, the tubes $V_9$ to $V_{12}$ cease to conduct as the voltage at J falls successively below their cathode voltages. On the negative half cycle the same sequence is caused to take place by reversing the diodes and again providing the proper bias on each diode plate. The resulting since wave approximation appearing between points J and K is then amplified and fed to the output of the instrument, the amplifier also serving as a buffer stage to prevent loading on the sine wave shaping system.

The settings of bias on the diodes $V_9$ to $V_{12}$, inclusive, are derived from the same current branch as reference voltages A and B. As previously mentioned, a change in the B+ voltage does not cause a frequency change but instead a proportional change in the triangular wave magnitude. The biasing of tubes $V_9$ to $V_{16}$ will also change in such a manner that the sine wave approximation will not appreciably deteriorate due to the variation in amplitude of the triangular wave.

Figure 7 illustrates the wave forms appearing between various points in the circuit of Figure 6. The first two of these curves illustrate the square waves from C to B— and from D to B—. The third and fourth curves illustrate the square waves after clamping. The fifth curve illustrates the square wave between G and B—. The sixth curve of Figure 7 illustrates the triangular wave from the integrator I, with the reference voltages A and B at the apexes of the wave. The last curve represents the composite sine wave form which is indicated in Figure 6 as being supplied to the output amplifier.

I claim:

1. In electrical apparatus for the generation of electrical pulses of sine wave form, means for generating pulses of a predetermined frequency and of uniform non-sine wave form, and a sine function generator coupled to receive pulses from said first means and having an output circuit, said sine function generator serving to produce a sine wave in the output circuit from the non-sine wave applied to the same by said first means, said sine function generator including a plurality of devices connected in the output circuit and having asymmetric nonlinear characteristics, and including means biasing and poling said devices whereby the generator will produce a plurality of contiguous wave segments defining a composite sine wave in said output circuit.

2. In electrical apparatus for the generation of electrical pulses of sine wave form, means for generating pulses of uniform triangular wave form, and a sine function generator couple to receive pulses from said first means and having an output circuit, said sine function generator including means serving to produce a composite sine wave in the output circuit from the triangular wave applied to the same by said first means, said last means including a plurality of asymmetric nonlinear current conducting paths, and including means controlling the time of passage of current in said paths for producing voltages constituting contiguous wave elements defining the sine wave in the output circuit.

3. Apparatus as in claim 2 including vacuum tubes each having a plate and a cathode forming one of said current conducting paths, and wherein said last-mentioned means comprises a source of bias for said vacuum tubes.

4. In electrical apparatus for the generation of electrical pulses of sine wave form, means for generating pulses of uniform triangular wave form, and a sine function generator couple to receive pulses from said first means and having an output circuit, said generator including a plurality of vacuum tubes each having a plate and cathode and each providing an asymmetric nonlinear current conducting path from the plate to the cathode of the same, said generator including means biasing the vacuum tubes to different levels of cutoff whereby the conduction of the generator will produce a plurality of contiguous wave segments defining a composite sine wave in the output circuit.

5. In electrical apparatus for the generation of electrical pulses of sine wave form, means for generating pulses of a predetermined frequency and of uniform non-sine wave form, and a sine function generator coupled to receive pulses from said first means and having an output circuit, said sine function generator serving to produce in the output circuit contiguous wave segments defining a composite sine wave in the output circuit from the non-sine wave applied to the generator by said first means and including a plurality of diodes connected in the output circuit, and biasing means for the diodes, said biasing means controlling the conduction of said diodes for causing the generator to produce said contiguous wave segments in the output circuit.

6. In electrical apparatus for the generation of electrical pulses of sine wave form, means for generating pulses of uniform triangular wave form and of a desired predetermined frequency, and a sine function generator coupled to receive pulses from said first means and having an output circuit, said sine function generator serving to produce in the output circuit contiguous wave segments defining a composite sine wave in the output circuit from said triangular wave form applied to the same by said first means and comprising a resistive and noninductive network including a plurality of diodes, and a source of bias for the diodes, said source being connected to said diodes by said network and said diodes conducting for producing said wave segments.

7. In electrical apparatus for the generation of electrical pulses of sine wave form, means for generating pulses of square wave form and of a predetermined frequency within a frequency range of operation, means for producing a uniform triangular wave from said square wave, and a sine function generator coupled to receive pulses from said last means and having an output circuit, said sine function generator serving to produce in the output circuit contiguous wave segments defining a composite sine wave in the output circuit from the triangular wave applied to the same by said last means and including a device with a non-linear characteristic which is independent of the frequency, said device including a plurality of diodes poled and biased so that they will conduct to produce said contiguous wave segments.

8. In electrical apparatus for the generation of electrical pulses of sine wave form, means for generating pulses of uniform wave form at a predetermined frequency within a frequency range of operation, the wave form being symmetrical with respect to a base line extending midway between the peak voltages, and a sine fuction generator coupled to receive pulses from said first means and serving to provide contiguous wave segments producing a composite sine wave form between output terminals, said generator comprising a resistive and non-resonant network forming a plurality of paths which in effect are in shunt with the output terminals, each of said paths including an asymmetric non-linear device having a non-linear characteristic which is independent of the frequency, the devices being in two groups with each group comprising at least two devices, the devices of one group being poled oppositely to the devices of the other group, the devices of each group having such characteristics that for voltages corresponding to base and peak voltages of the applied wave form, they are respectively all non-conducting and all conducting, and for voltage changes from base to peak value they become successively conducting, said network producing at said output terminals the continguous wave segments producing said composite sine wave.

9. Apparatus as in claim 8, including means for applying biasing voltages to the devices of one of said groups, and means for applying to the other group of devices biasing voltages of a different value from those of the first-mentioned biasing means.

References Cited in the file of this patent

UNITED STATES PATENTS

| | | |
|---|---|---|
| 2,441,983 | Young | May 25, 1948 |
| 2,456,026 | Shenk | Dec. 14, 1948 |
| 2,461,637 | Germany | Feb. 15, 1949 |
| 2,461,871 | Bass | Feb. 15, 1949 |
| 2,471,168 | Posthumus | May 24, 1949 |
| 2,500,863 | Posthumus | Mar. 14, 1950 |
| 2,541,039 | Cole | Feb. 13, 1951 |
| 2,559,144 | Baracket | July 3, 1951 |
| 2,566,762 | English | Sept. 4, 1951 |
| 2,621,292 | White | Dec. 9, 1952 |
| 2,675,469 | Harker et al. | Apr. 13, 1954 |